C. TYLER.
Improvement in Churn-Thermometers.
No. 128,930.                    Patented July 9, 1872.
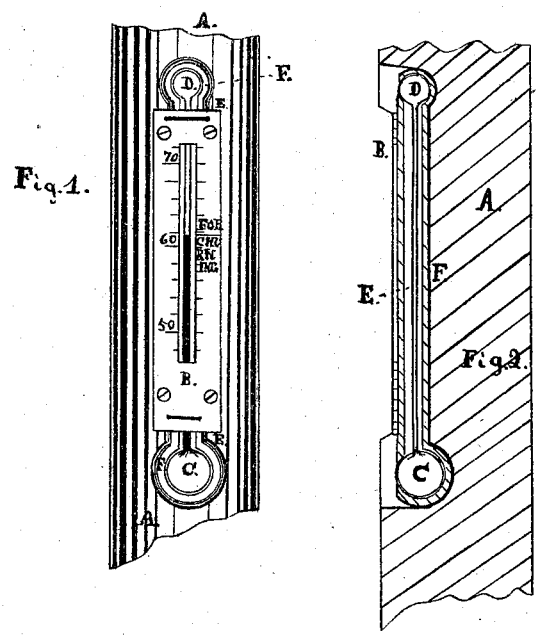
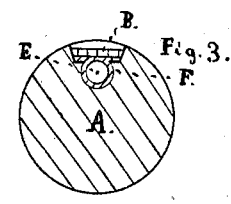

UNITED STATES PATENT OFFICE.

CYRUS TYLER, OF ETNA, NEW YORK.

IMPROVEMENT IN CHURN-THERMOMETERS.

Specification forming part of Letters Patent No. 128,930, dated July 9, 1872.

SPECIFICATION.

*To all whom it may concern:*

I, CYRUS TYLER, of the village of Etna, in the town of Dryden, Tompkins county, New York, have invented an Improved Dairy Thermometer, whereof the following is a specification:

Figure 1 is a view of a portion of a churn-dasher with my device in it. Fig. 2 is a longitudinal section of the same and my packing; and Fig. 3 is a transverse section of my thermometer in the dasher-handle, and with the packing.

In Fig. 1, A is a part of the dasher-handle that goes beneath the churn-cover into the churn. B is the register-plate, indicating the temperature. C is the lower bulb of my thermometer; and D is an upper bulb, usually empty, but more or less filled when, from any cause—as hot water used in scalding or in other ways—the mercury is made to ascend sufficiently; and the utility of this upper bulb arises out of the facts that the longer the stem of a thermometer the greater the liability to breakage, the more there is of it to clean, &c. Therefore I make the thermometer small, yet with a large mercury-bulb, for the sake of distinctly seeing the degree of temperature; and I have therefore adopted the upper bulb or enlarged end D to receive the surplus mercury caused by sudden or undue expansion from any exposure to a temperature higher than that ordinarily necessary for churning. E is the short stem connecting the two bulbs; and F shows that about most of the bulb and stem is an India-rubber packing. This is cast and vulcanized the shape of the bulbs and stem, and lies between them and the wood of the dasher-handle for the purpose of easing the jar of the dasher in churning.

The advantages and uses of my invention are apparent to those skilled in the art to which it appertains.

While I am aware that thermometers have been used in churning, and that double-bulbed thermometers have been employed in baking and for similar uses; and register-plates, and rubber and other elastic packing for the general use of preventing breakage of articles of glass, are no novelty; yet my object is to arrange a thermometer in the handle of a dasher in a novel manner, so as to use it conveniently; and the nature of my invention will be apparent as I have described it.

I claim—

The double-bulbed thermometer C D, arranged in a churn dasher-handle, and protected by the casing of elastic rubber, and slotted external register-plate B, substantially in the manner and for the purpose specified.

CYRUS TYLER.

Witnesses:
SAMUEL J. PARKER,
JOSEPH G. HUBBEL.